Aug. 5, 1924.
1,504,156
H. C. SOMERS
SANITARY ATTACHMENT FOR TELEPHONE MOUTHPIECES
Filed March 7, 1923
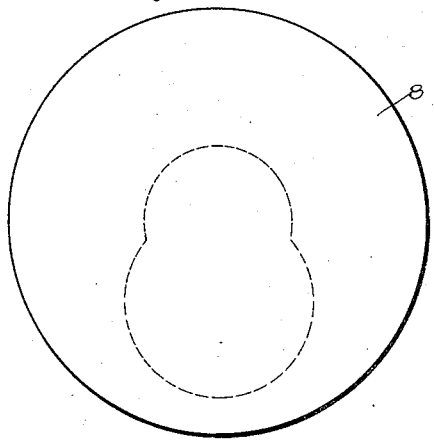
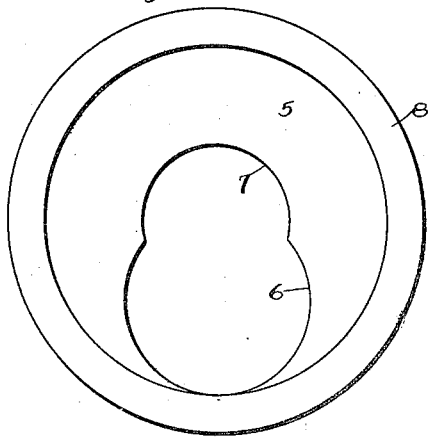
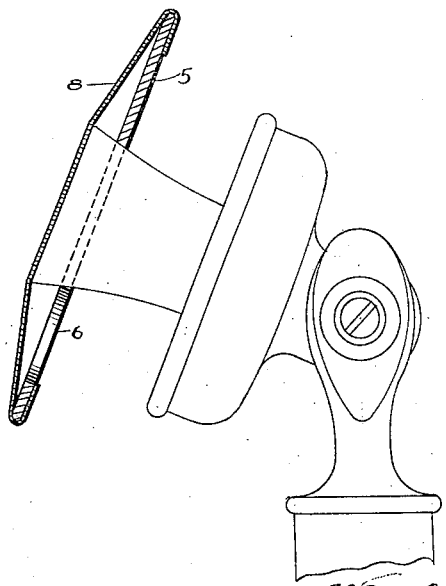
Helen C Somers,
INVENTOR.
BY Victor J. Evans,
ATTORNEY.
WITNESS: JBWhite Patented Aug. 5, 1924.

1,504,156

UNITED STATES PATENT OFFICE.

HELEN C. SOMERS, OF JERSEY CITY, NEW JERSEY.

SANITARY ATTACHMENT FOR TELEPHONE MOUTHPIECES.

Application filed March 7, 1923. Serial No. 623,482.

*To all whom it may concern:*

Be it known that I, HELEN C. SOMERS, a citizen of the United States, residing at Jersey City, in the county of Hudson and State of New Jersey, have invented new and useful Improvements in Sanitary Attachments for Telephone Mouthpieces, of which the following is a specification.

This invention relates to sanitary attachments for telephone mouth pieces.

An object of the invention is to provide a device of this character which can be conveniently applied to or removed from the mouth piece and which will be structurally designed so as to not interfere with the acoustic properties of the telephone instrument.

A still further object of the invention is to provide a device of this character which shall be simple of construction, effective for the purpose intended and which will consist of parts that are so assembled as to permit the device to be sold from vending machines and used advantageously for advertising purposes.

A further object of the invention is to provide a device of this character consisting of non-metallic parts correlated and designed to constitute an effective means for retaining the device in its adjusted position upon the mouth piece.

With these and other objects in view, the invention resides in certain novel construction and combination and arrangement of parts, the essential features of which are hereinafter fully described, are particularly pointed out in the appended claims and are illustrated in the accompanying drawings, in which:—

Figure 1 is a front view of the device.

Figure 2 is a rear view thereof.

Figure 3 is a vertical section therethrough showing the device in its applied position upon the mouth piece of a telephone.

In carrying the invention into practice, I use a flexible card-board disk 5 or the equivalent thereof, the same provided with a substantially key hole shaped slot having communicating branches 6 and 7 of relatively different proportions. These branches are somewhat circular as shown and the branch 6 is proportioned to permit it to be freely passed over the large end of a mouth piece. The restriction between the branches 6 and 7 is such that after the mouth piece has been projected through the branch 6, the neck of the mouth piece can be adjusted through the restricted portion of the slot and the walls of the branch 7 made to embrace the mouth piece in a manner which will hold the device in its adjusted or applied position.

At one side of the disk member 5 is a single piece of soft fabric material 8 in the form of cheese cloth, cotton or the like, the nature of which is flexible and absorbent so that it will adjust itself at the open end of the mouth piece of the telephone when the device is applied. The material 8 is secured to its marginal edge to the opposite side of the disk 5 in any suitable well-known manner preferably by adhesive. The member 8 may be saturated with a suitable disinfectant solution. As I do not claim anything for this solution the constituents thereof will not be referred to herein.

The entire structure is so formed that the material 8 co-acts with the disk 5 to securely hold the device in its adjusted position upon the mouth piece and to permit the device to be easily applied or removed as the occasion necessitates. Due to the normal flat condition of the device same may be sold in a flat package and dispensed from a vending machine or sold in flat sanitary packages. The form of the device is also such that suitable advertising matter may be printed thereon and employed advantageously.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claims.

What is claimed as new is:—

1. A sanitary mouth piece attachment for telephones comprising a disk formed with a slot having an enlarged portion and a restricted portion, and a piece of yieldable material secured to the marginal edge of said disk.

2. A sanitary mouth piece attachment for telephones comprising a disk formed with a slot having an enlarged portion and a restricted portion, and a piece of yieldable material secured to the marginal edge of said disk, whereby said disk is adapted to be applied to the mouth piece by inserting the same in the enlarged portion of the slot and moving the disk to bring the restricted portion of the slot into co-acting engagement with the mouth piece to hold the yieldable material in a taut condition across the open end of the mouth piece.

In testimony whereof I hereby affix my signature.

HELEN C. SOMERS.